United States Patent
Kawai et al.

(10) Patent No.: US 7,328,840 B2
(45) Date of Patent: Feb. 12, 2008

(54) ELECTRONIC MONEY SYSTEM AND TRANSACTION METHOD USING THE SAME

(75) Inventors: Shigeyuki Kawai, Tokyo (JP); Koji Ito, Tokyo (JP)

(73) Assignee: Sony Corporation (JP)

(*) Notice: Subject to any disclaimer, the term of this patent is extended or adjusted under 35 U.S.C. 154(b) by 45 days.

(21) Appl. No.: 10/840,217

(22) Filed: May 7, 2004

(65) Prior Publication Data

US 2004/0206814 A1    Oct. 21, 2004

Related U.S. Application Data

(63) Continuation of application No. 09/580,542, filed on May 30, 2000, now Pat. No. 6,764,001.

(30) Foreign Application Priority Data

Feb. 28, 1999   (JP) ............................... P11-097962

(51) Int. Cl.
  *G06K 5/00* (2006.01)
  *G06F 17/60* (2006.01)
(52) U.S. Cl. .................. 235/380; 235/379; 705/17; 705/39; 705/41
(58) Field of Classification Search ............... 235/375, 235/379–381, 382, 383; 705/43, 16, 17; 902/8–21, 37–40
  See application file for complete search history.

(56) References Cited

U.S. PATENT DOCUMENTS 4,114,027 A * 9/1978 Slater et al. .................. 705/43

FOREIGN PATENT DOCUMENTS

| EP | 0 416 916 | 3/1991 |
| EP | 0 666 549 | 8/1995 |
| EP | 0 831 438 | 3/1998 |
| EP | 0 865 007 | 9/1998 |
| GB | 2 303 956 | 3/1997 |
| JP | 2000-1163 | 1/2000 |
| WO | 99/50803 | 10/1999 |

* cited by examiner

*Primary Examiner*—Jamara A. Franklin
(74) *Attorney, Agent, or Firm*—Rader Fishman & Grauer PLLC; Ronald P. Kananen

(57) ABSTRACT

An electronic money system and an electronic money terminal used therein which facilitate and promote the transaction by card representing cash. A user carries out a transaction by using an information card storing data representing monetary value, and in a case where the balance on the card is insufficient, the balance due is charged to a designated account or paid by loan. The user of the information card is able to carry out a transaction solely by information card even when the balance stored in the information card is insufficient.

18 Claims, 15 Drawing Sheets

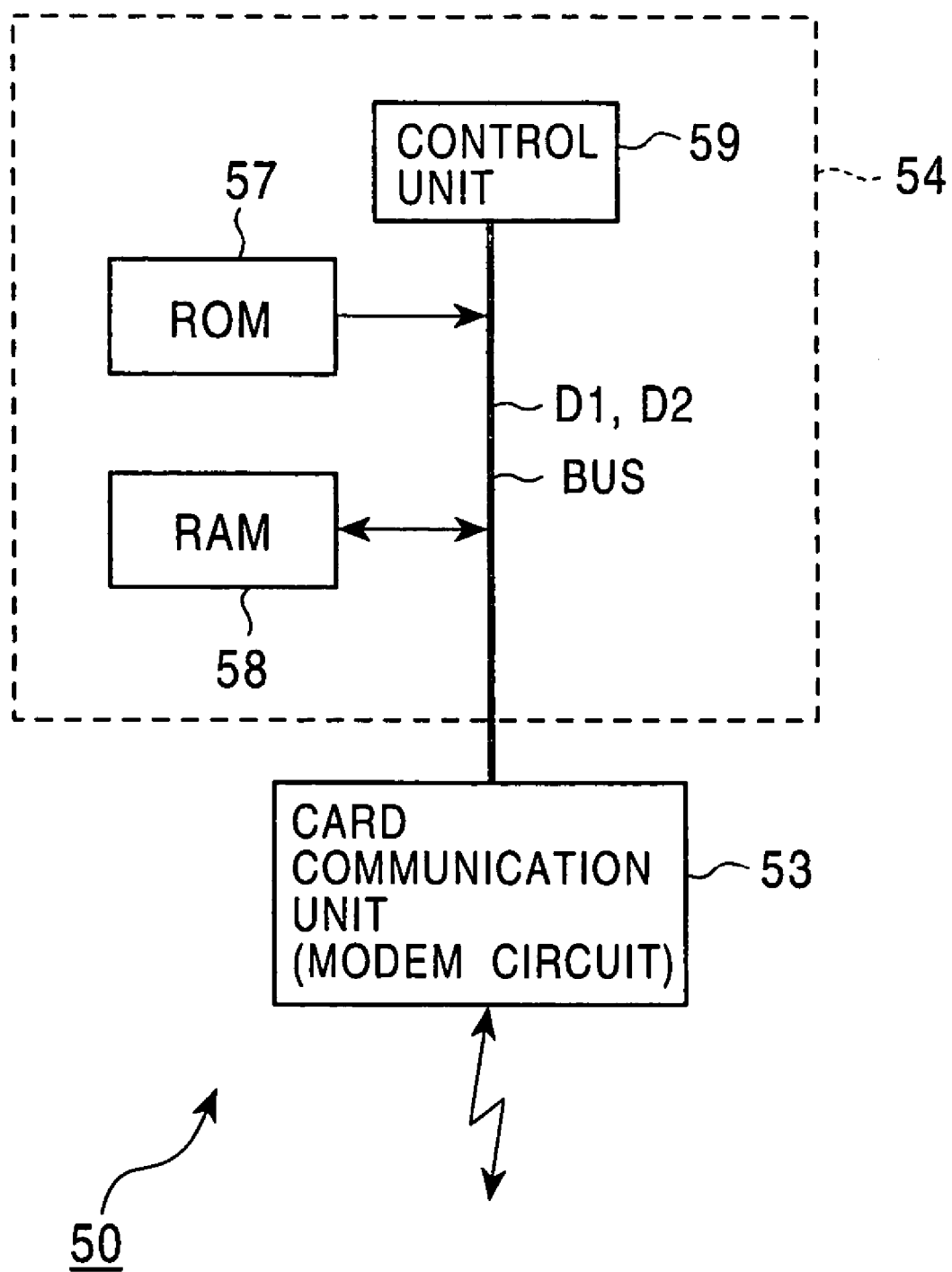

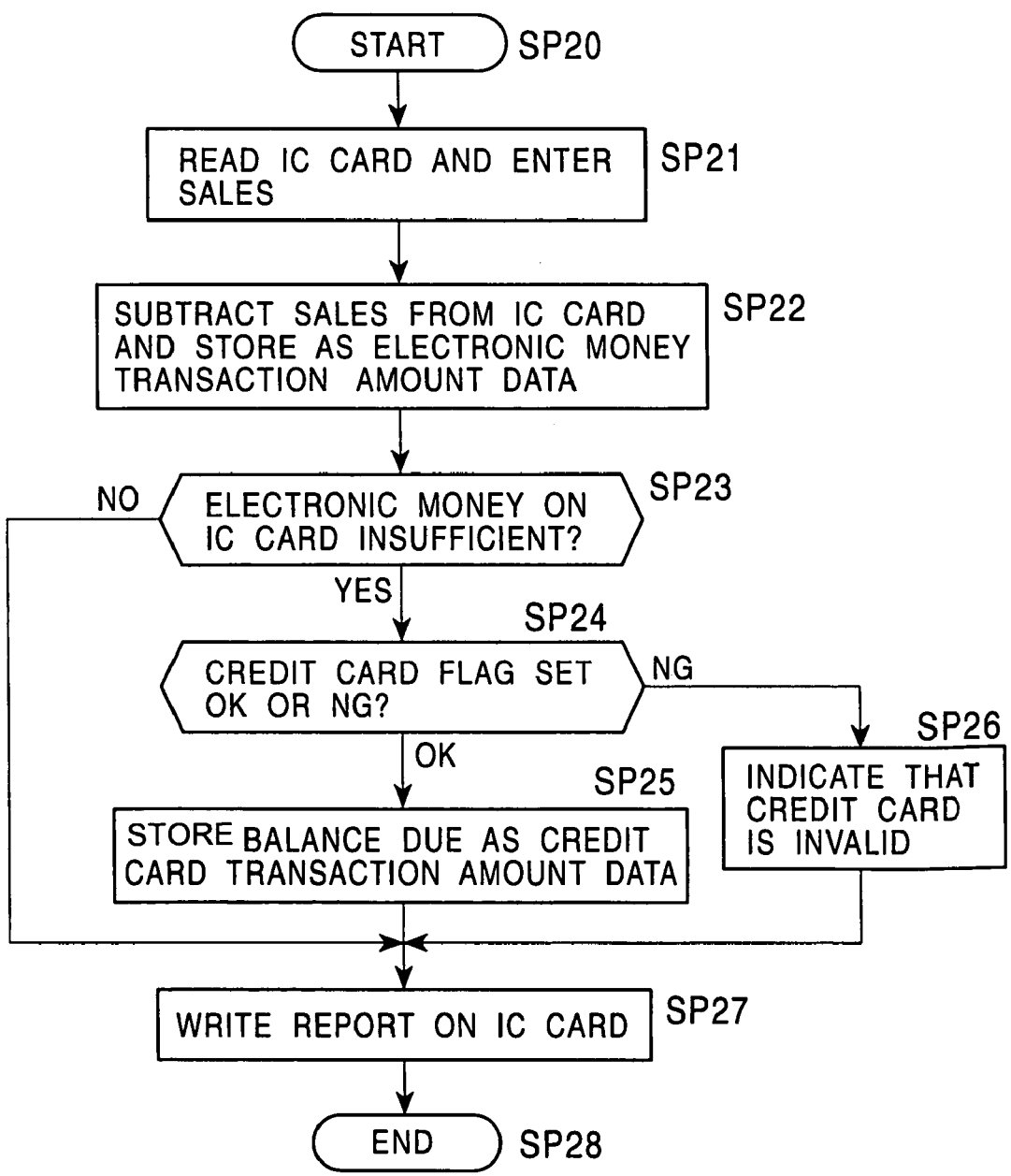

| | | CONTENT | BYTE |
|---|---|---|---|
| D23₁ | 1 | CARD TRANSACTION S/N (A) | 32 BYTES |
| D23₂ | 2 | LOG TYPE | |
| | 3 | (RESERVED) | |
| D23₃ | 4 | DATE TIME | |
| D23₄ | 5 | TERMINAL NUMBER | |
| D23₅ | 6 | DEALING VALUE (UNSIGNED) | |
| | 7 | CARD TRANSACTION S/N (B) | |
| D23₆ | 8 | SIGNATURE1 KEY VERSION | |
| D23₇ | 9 | BALANCE DATA | |
| D23₈ | 10 | TERMINAL TRANSACTION S/N | |
| | 11 | (RESERVED) | |
| D23₉ | 12 | SIGNATURE1 | |

| | | | |
|---|---|---|---|
| D23A₁ | 13 | CARD IDm | 16 BYTES |
| D23A₂ | 14 | TERMINAL TRANSACTION FLAG | |
| | 15 | (RESERVED) | |
| D23A₃ | 16 | SIGNATURE2 KEY VERSION | |
| D23A₄ | 17 | SIGNATURE2 | |

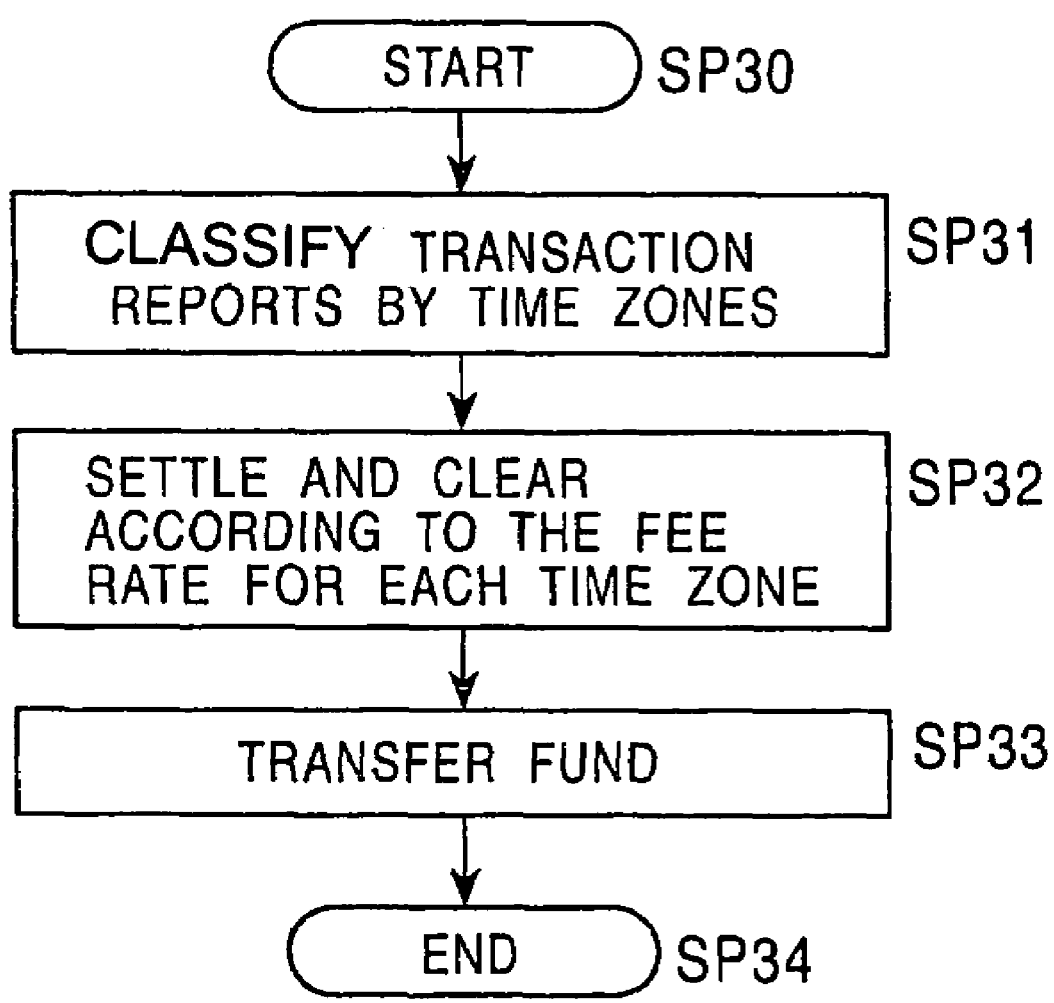

ELECTRONIC MONEY SYSTEM AND TRANSACTION METHOD USING THE SAME

This application is a continuation application of Ser. No. 09/580,542 filed May 30, 2000, now U.S. Pat. No. 6,764,001, issued Jul. 20, 2004.

BACKGROUND OF THE INVENTION

1. Field of the Invention

The present invention relates generally to an electronic money system and an electronic money terminal used therein, and more particularly to an electronic money system, as well as to an electronic money terminal, operative with the use of a portable electronic device which is typically but not exclusively an information card storing monetary value data. The invention also is concerned with a transaction method which uses the electronic money system.

2. Description of the Related Art

A cash card or credit card issued by a bank or a credit company when used requires a salesclerk at a store equipped with a compatible card terminal to operate the card terminal to read the card number stored in a magnetic stripe on the card and to enter the amount of the sales The card terminal then forms a connection with a management computer of a bank or credit company and sends information, such as the card number and the amount of the sales, to the management computer. The management computer manages such information as expiration dates, transaction limits, and loss and theft, for each card a user carries, and determines whether the card transaction is allowable based on the information regarding the card number and the amount of the transaction sent from the card terminal via communication lines. When a card transaction is allowable, the management computer sends back information to that effect and debits the transaction amount from the designated account.

As seen from the above, the system using a cash card or credit card requires transmitting a card verification request from a card terminal to the management computer of the bank or the credit company each time the user uses the card. The conventional system thus has a disadvantage of requiring the connection forming process, making the process of card transaction somewhat cumbersome.

SUMMARY OF THE INVENTION

Accordingly, it is an object of the present invention to provide an electronic money system and an electronic money terminal used therein, as well as a transaction method, that facilitate and promote transactions using a portable electronic device or unit, typically an information card, which represents monetary value.

To this end, according to one aspect of the present invention, there is provided an electronic money system, comprising: an electronic money terminal having withdrawing means for withdrawing a transaction amount from electronic money representing monetary value stored in a portable electronic device and processing means form processing a balance due when the transaction amount exceeds the amount stored in the portable electronic device; and an electronic money management means for compiling the transaction amount withdrawn from the electronic money through the electronic money terminal and the amount processed by the balance due processing means.

The portable electronic device may be an information card.

Preferably, the information card is a contactless-type information card which exchanges the amount data in a contactless manner.

The electronic money system may further comprise a money deposit terminal for updating the amount data stored in the portable electronic device.

The arrangement may be such that the balance due processing means processes the balance due such that the balance due is paid on credit.

The balance due processing means may have reading means for reading a credit flag embedded in the electronic device.

The electronic device may have a personal identification function.

Preferably, the electronic device is integrated with a communication terminal.

In accordance with another aspect of the present invention, there is provided an electronic money terminal in which settlement and clearing are carried out by using electronic money contained in an electronic device comprising a processing means for processing the payment of a balance due so that the payment is deferred when an amount of a transaction exceeds the amount of money data contained in the electronic device representing monetary value at the time the transaction amount is withdrawn from a balance.

The arrangement may be such that the processing means shares the balance due to a designated account or loans, namely, it determines whether the balance due is to be funded from the account or loan, or from both of them, and stores the share or the funded amount.

The present invention in still another aspect provides a transaction method which uses electronic money comprising the steps of: subtracting a transaction amount from electronic money contained in an electronic device; and, processing a payment of a balance due so that the payment is deferred when the transaction amount exceeds the amount of electronic money contained in the electronic device.

In this method, the deferred payment of the balance due may be funded from a designated account or by a loan.

The present invention in further aspect provides an electronic money system comprising: an electronic money terminal having means for withdrawing a transaction amount from a balance on an electronic device having an information storage unit for storing electronic money representing monetary value and allowing the payment of any balance due to be deferred when the transaction amount exceeds the balance; and, an electronic money management means for compiling the transaction amount withdrawn from the balance in the electronic device through the electronic money terminal and an amount of the allowed deferred payment.

The electronic device may be a card-type storage medium.

Preferably, the card-type storage medium is a contactless information card which exchanges the transaction amount data in a contactless manner.

The electronic device may have at least one of a communication terminal function, a personal identification and verification function, and an entry or exit key function.

Preferably, the electronic money management means is arranged to record the date and time of the transaction using the electronic device and the amount of the transaction.

The user of the electronic money system having the foregoing features carries out a transaction by using an electronic device, typically an information card, which stores data representing monetary value, and when the balance on the card is short, changes the balance due to a designated account or pays by a loan. The user of the information card is, therefore, able to carry out a transaction solely by the electronic device, e.g., an information card, even when the balance stored therein is insufficient. The use, therefore, can fully enjoy the advantages offered by the use of the electronic money system.

The above and other objects, features and advantages of the present invention will become clear from the following description of the preferred embodiments when the same are read in conjunction with the accompanying drawings.

It is to be noted that the electronic device to be used in the electronic money system of the invention is not limited to a card-type medium, although information cards are specifically mentioned in the following description. Thus, any portable electronic device which carries data representing monetary value can be used, for example, a mobile phone, a mobile computer or a watch. Furthermore, an information card may have one or more functions in addition to carrying electronic data representing monetary value. For example, an information card may also serve as a personal identification card for office staffs, an electronic key for locking an unlocking the office (especially where the security is demanded), a railway pass, a driver's license, a passport, an insurance document, or the like, depending on the contents of memory mounted on the electronic device. Thus, the present invention can be implemented in a variety of forms, and all such forms are encompassed by the scope of the present invention.

BRIEF DESCRIPTION OF THE DRAWINGS

FIG. 6 is a block diagram of an IC card;

FIG. 13 is a flow chart of an IC card transaction routine using an electronic money terminal;

FIGS. 14A and 14B illustrate electronic money log data; and

FIG. 15 is a flow chart of settling and clearing routine in an electronic money management unit.

DESCRIPTION OF THE PREFERRED EMBODIMENT

One embodiment of the present invention will now be described in detail with reference to the accompanying drawings.

(1) Configuration of an Electronic Money System

Figure 1:
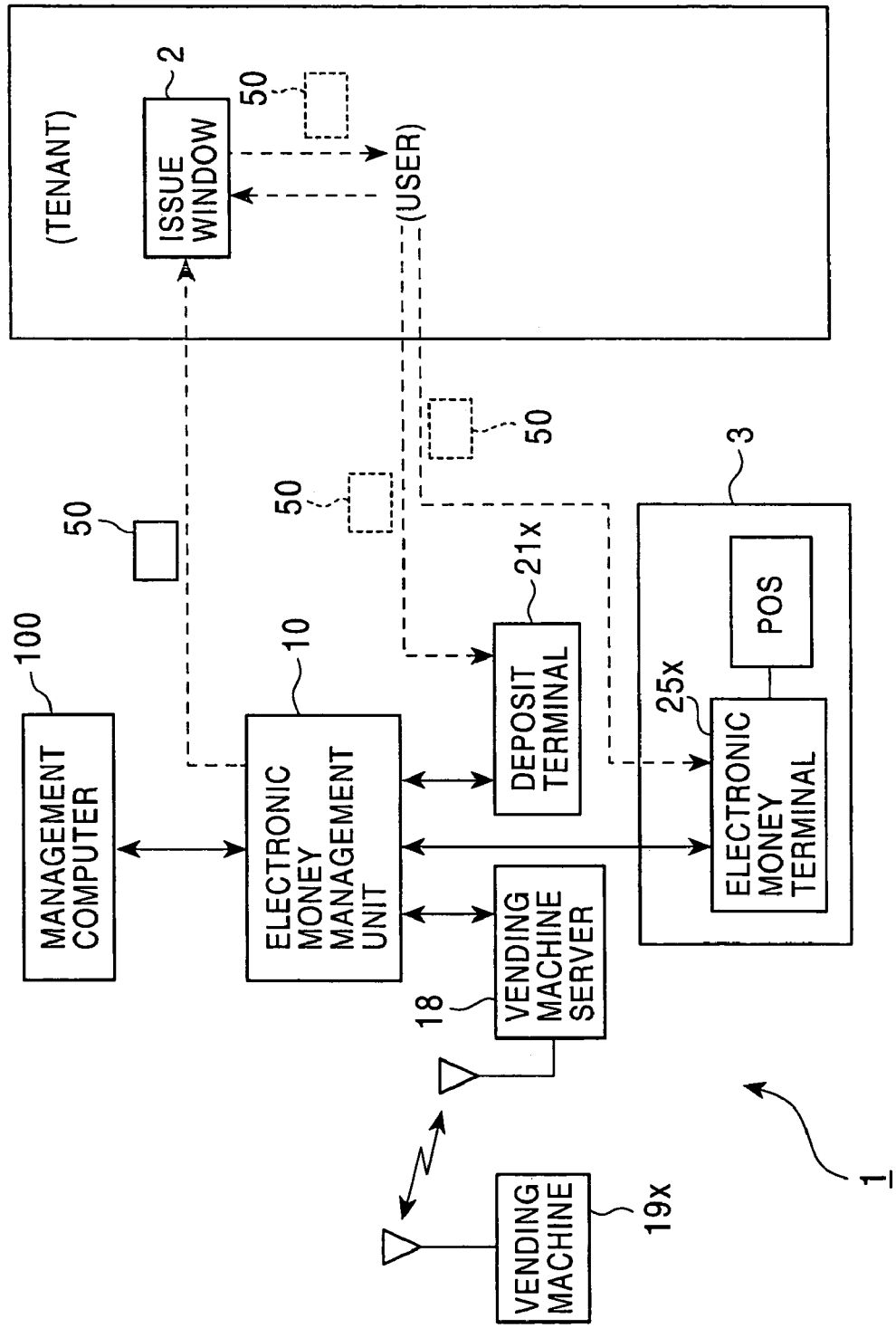
FIG. 1 is a block diagram of an embodiment of the electronic money system according to the present invention.

Referring now to FIG. 1, an electronic money system, generally denoted by reference numeral 1, has the following components: an electronic money management unit 10 serving to issue IC cards 50 while managing electronic money and settling and clearing the electronic money account; a plurality of deposit terminals $21_x$ that are used to deposit electronic money (money data) into IC cards 50; a plurality of electronic money terminals $25_x$ located at outlets 3 for accepting payment from users through the IC cards 50 on which electronic money is held; vending machines 19 which sell commercial items to users when paid by means of the IC cards 50; and, a vending machine server 18 which stores data from the vending machines concerning the reports of uses of the IC cards 50, such as monetary amounts of transactions, dates and times.

Figure 2:
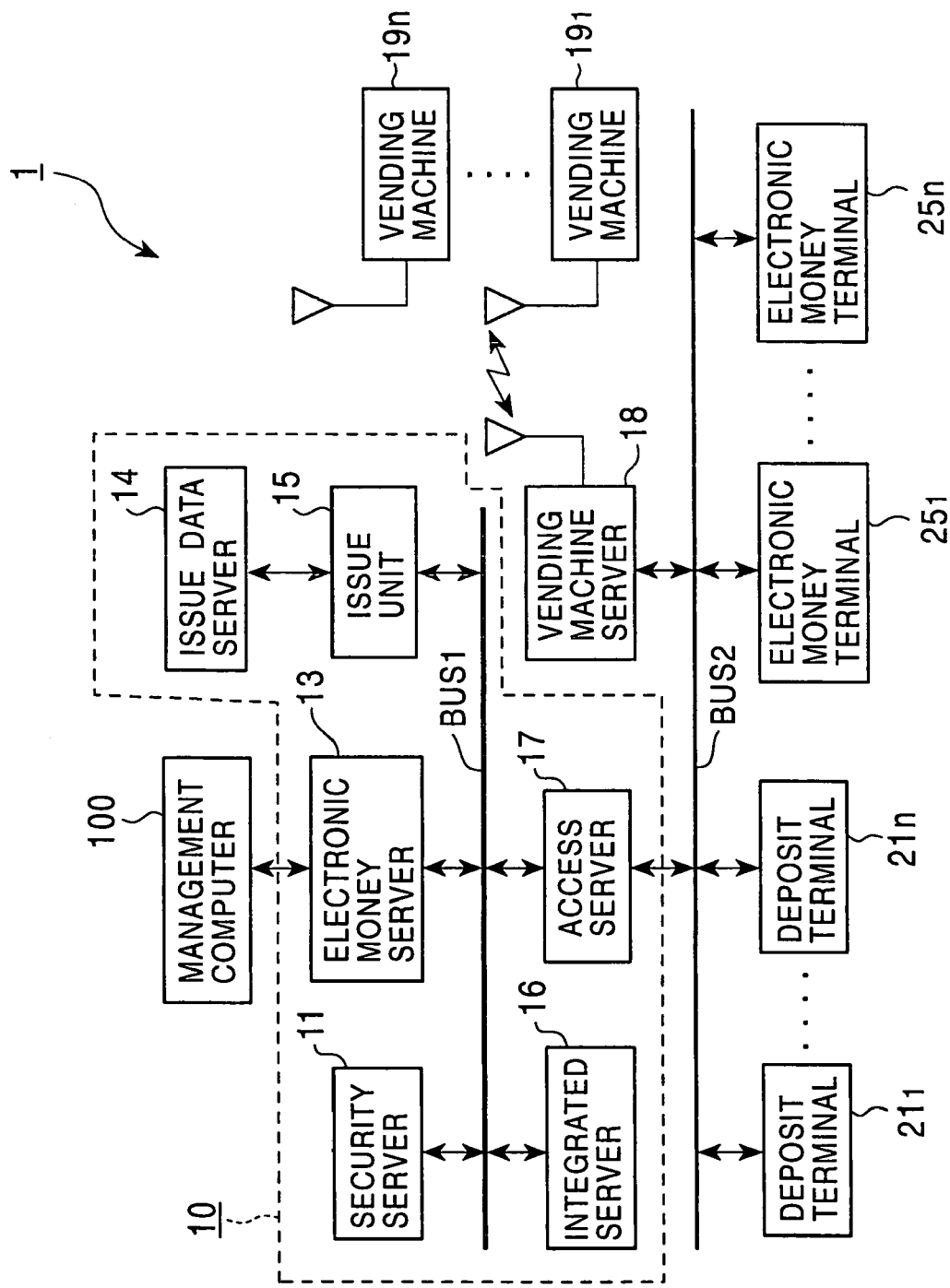
FIG. 2 is a block diagram of an electronic money management unit.

Referring now to FIG. 2, the electronic money management unit 10 in the electronic money system 1 includes a security server 11, an electronic money server 13, an issue data server 14, an issue unit 15, an integrated server 16, and an access server 17. These servers are connected to one another through a data bus BUS1, forming a first LAN (Local Area Network). Also, deposit terminals $21_1$ to $21_n$, electronic money terminals $25_1$ to $25_n$, and the vending machine server 18 linked to the vending machines $19_1$ to $19_n$ are connected to one another through a data bus BUS2, forming a second LAN. The first and second LANs are connected to each other via the access server 17.

Figure 3:
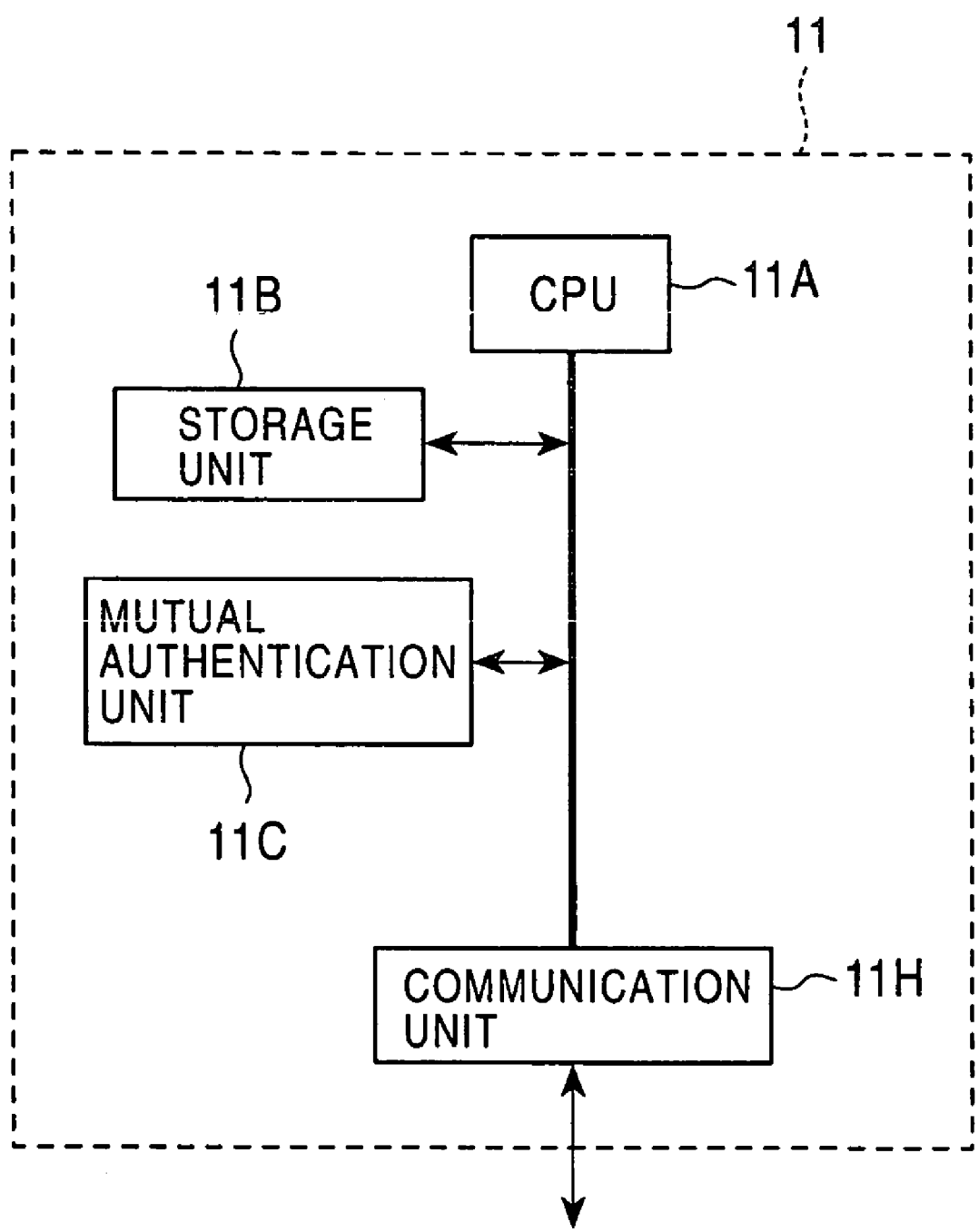
FIG. 3 is a block diagram of a security server.

As shown in FIG. 3, the security server 11 in the electronic money management unit 10 includes a CPU (Central Processing Unit) 11A, a storage unit 11B, a mutual authentication unit 11C, and a communication unit 11H. The CPU 11A is operated according to an operating program stored in the storage unit 11B. Data exchanged between the integrated server 16 and other terminals or servers enters the CPU 11A via the communication unit 11H. The CPU 11A allows the exchanged data to be encrypted with a predetermined encryption key. The CPU 11A further allows the mutual authentication unit 11C to verify the data source.

Figure 4:
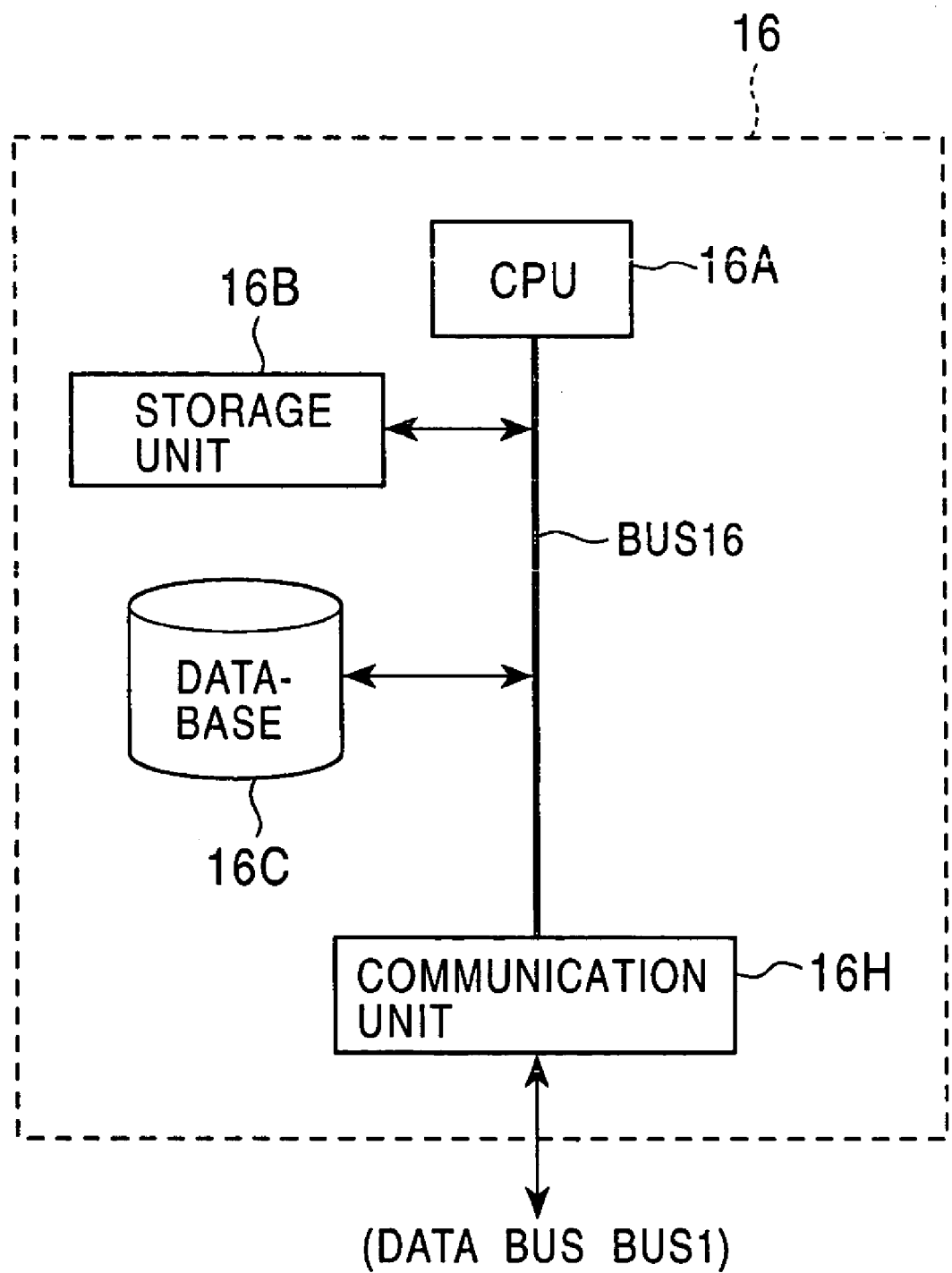
FIG. 4 is a block diagram of an integrated server.

Referring to FIG. 4, the integrated server 16 includes a CPU 16A, a storage unit 16B, a database 16C, and a communication unit 16H. The CPU 16A runs on an operating program stored in the storage unit 16B. The CPU 16A allows various transaction reports to be passed over the second LAN, through the access server 17, over the first LAN, via the security server 11 to the integrated server 16. Such transaction reports include, but may not be limited to, amount data equivalent to the amount of money deposited through the deposit terminals $21_1$ to $21_n$, a transaction report of the IC card 50 including IC card number, and the transaction amounts and transaction dates, which are stored in the electronic money terminals $25_1$ to $25_n$. The integrated server 16 receives these reports from the communication unit 16H and then stores them into the database 16C via a data bus BUS16.

The integrated server 16 also stores in the database 16C the amount data to be withdrawn from a user's designated account, which is sent from a bank/credit card company management computer 100 (hereinafter sometimes referred to as a "management computer 100") via the electronic money server 13.

The electronic money server 13 transmits/receives data to/from the bank/credit card company management computer 100 external to the electronic money management unit 10 over predetermined communications lines. Further, the electronic money server 13 settles and clears the account, for example, once a month based on a variety of information on the electronic money stored in the database 16C of the integrated server 16.

In the issue data server 14, the IC card number of the IC card 50 issued by the issue unit 15 is registered into a database in combination with the credit card number of the user who possesses the IC card 50.

The vending machine server 18 stores transaction reports of the IC card 50 including transaction amounts and dates which have been transmitted from the vending machines 19₁ to 19ₙ. These reports are then delivered, for example, once a day, over the second LAN, via the security server 11 to the integrated server 16. The reports are then stored in database 16C of the integrated server 16.

According to the electronic money system 1 of the illustrated embodiment, the card issuing unit 15 in the electronic money management unit 10 issues IC (Integrated Circuit) cards 50 from/to which data can be read/written in a contactless manner. The IC cards 50 are then given to users at an issue window site 2 in each tenant company (see FIG. 1). Each of the IC cards 50 has a memory into which an IC card number is uniquely prestored.

Figure 5:
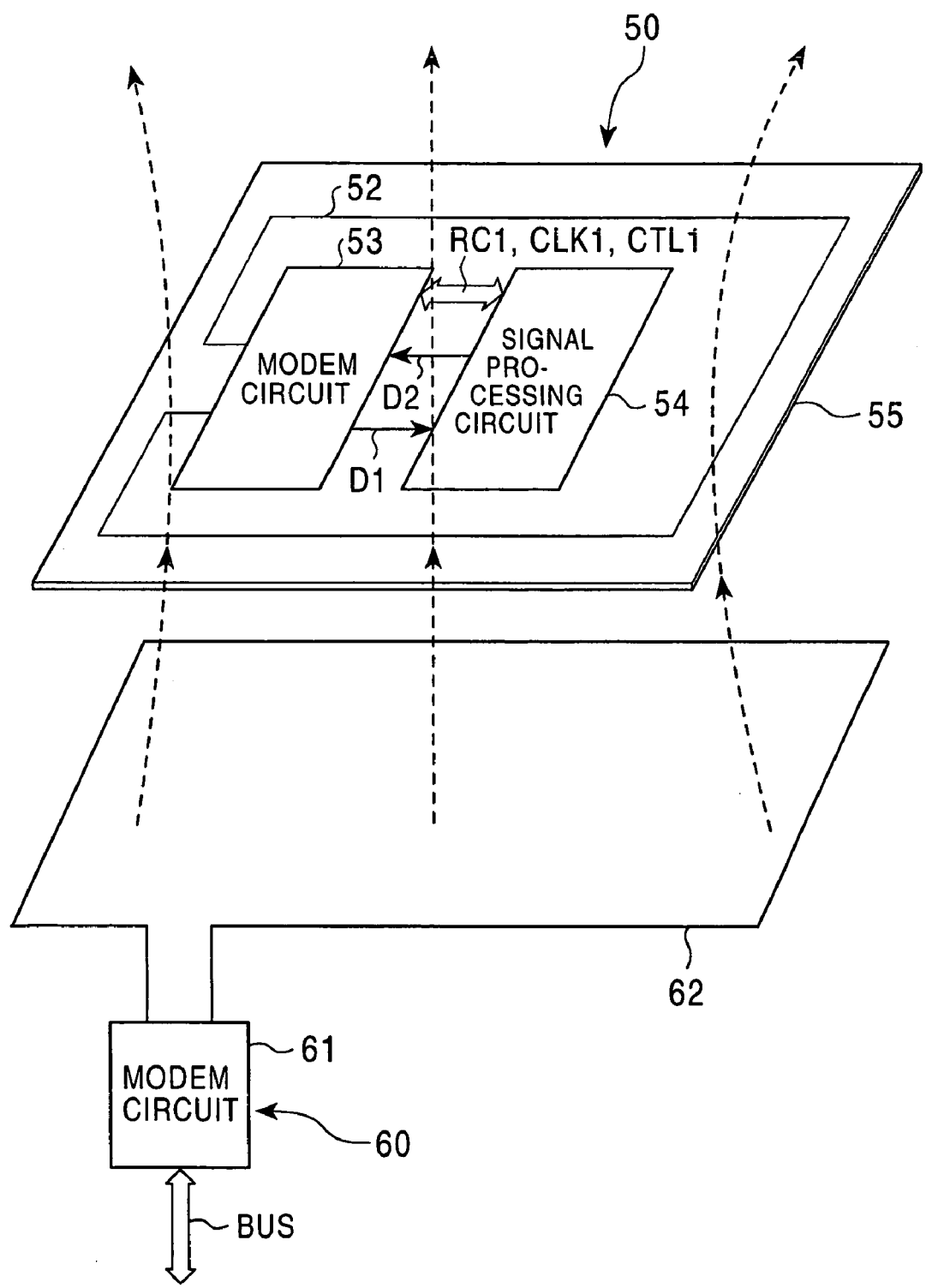
FIG. 5 is a schematic perspective view of an IC card.

Specifically, as shown in FIGS. 5 and 6, the IC card 50 is an IC card that is free of a battery for a power supply. The IC card 50 of this type includes a flat substrate 55 used as a base, a coiled loop antenna 52 for receiving the electromagnetic wave emitted from a data read/write unit 60 to convert it into an electric signal, a modem (modulation/demodulation) circuit 53 for modulating transmission data or demodulating received data, and a control unit 54 for analyzing the received data and generating data to be transmitted.

In the IC card 50 of this type, the electromagnetic wave emitted from the data read/write unit 60 is received by the loop antenna 52 and then transmitted as a modulated wave to the modem circuit 53. The modulated wave is demodulated by the modem circuit 53 and sent to a signal processing circuit 54 to be used as transmission data D1 that has been transmitted from the data read/write unit 60.

The signal processing circuit 54 incorporated a control unit 59, including a hard logic circuit or a CPU (Central Processing Unit), a memory unit including a ROM (Read Only Memory) 57, and a RAM (Random Access Memory) 58. The control unit 59 analyzes the transmission data D1 on the RAM 58 according to the program written to the ROM 57 and then reads various data D2 regarding the electronic money stored in the RAM 58 based on the analyzed transmission data D1, which is then sent to the modem circuit 53. The modem circuit 53 modulates the data D2 and delivers it to the data read/write unit 60 as an electromagnetic wave from the loop antenna 52 (see FIG. 5).

The modem circuit 53 contains a power supply circuit for converting electromagnetic wave energy into a stable dc power supply. The electromagnetic wave emitted from the data read/write unit 60 and received by the loop antenna 52 is based to generate a dc power supply DC1, which is then sent to the control unit 59. A clock signal CLK1 generated on the basis of the received electromagnetic wave also is sent to the control unit 59, while a control signal CTL1 for various controls is received from the control unit 59.

In the data read/write unit 60, various kinds of transmission data sent via a data bus BUS are input into a modem circuit 61, which modulates the input data according to the received data using a carrier wave of a predetermined frequency band so that the input data can be efficiently emitted as an electromagnetic wave. The modulated data is then emitted from a loop antenna 62 in the form of the electromagnetic wave.

Further, in the data read/write unit 60, the electromagnetic wave emitted from the IC card 50 is received as a modulated wave by the loop antenna 62 and sent to the modem circuit 61. The modem circuit 61 demodulates the modulated wave and then sends it as data transmitted from the IC card 50 to a signal processing unit (not shown) via the data bus BUS.

Figure 7A:
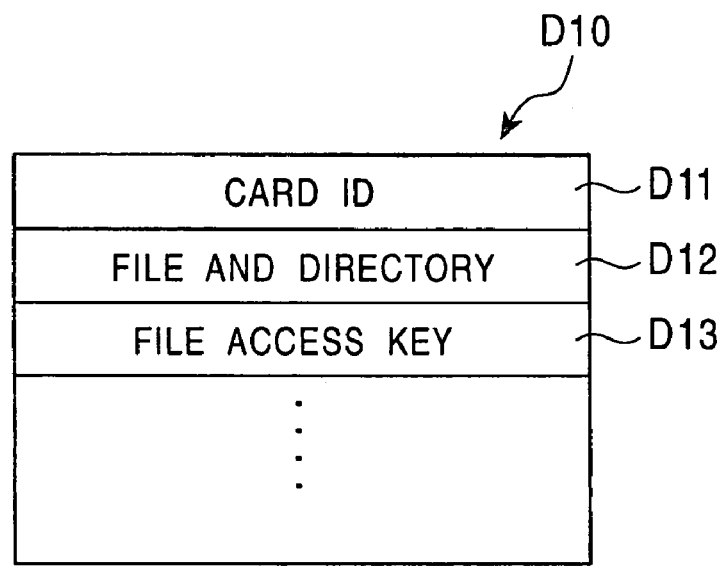
FIGS. 7A and 7B are illustrations of data written on the IC card.
Figure 7B:
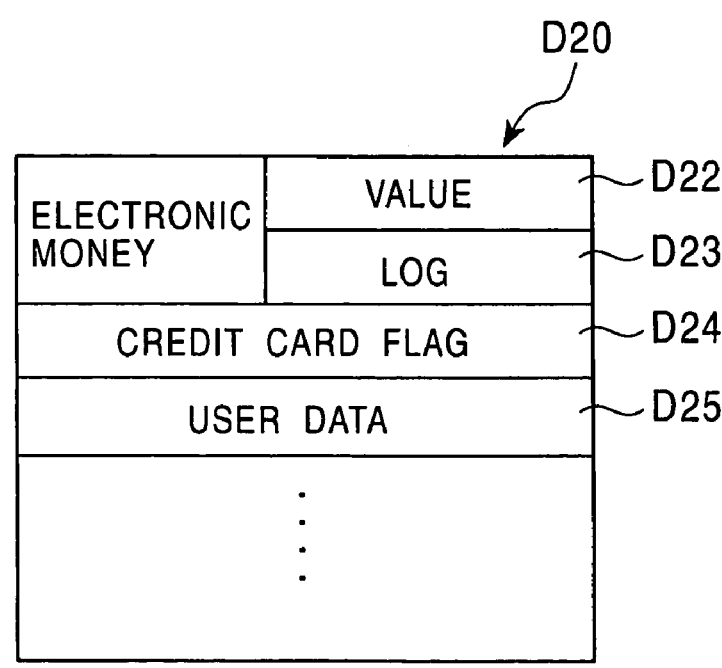

A variety of information on the electronic money is stored in RAM 58 of the IC card 50 where such information is saved into a plurality of files managed with a directory. Specifically, RAM 58 of the IC card 50 stores therein management information D10, or an upper-level information unit of the directory, and electronic money information D20, or a low-level information unit of the directory. The management information D10 may include but is not limited to IC card number D11, file/directory definition information D12 and file access key 13, as shown in FIG. 7A. As shown in FIG. 7B, the electronic money information D20 may include but is not limited to balance data D22 indicating a balance of electronic money, electronic money log data D23 indicating transaction reports of electronic money, a credit card flag D24 that is previously registered into the IC card 50 before the card is received by a user, as described later, and any other user information D25, such as staff number or entry/exit data. When the balance data D22 falls short of the amount data of the transaction amount while a user uses the IC card 50 for shopping and the like, the credit card flag D24 is used to indicate whether or not the balance due may be paid through a credit card. The aforementioned data are written to the files, respectively.

Figure 8:
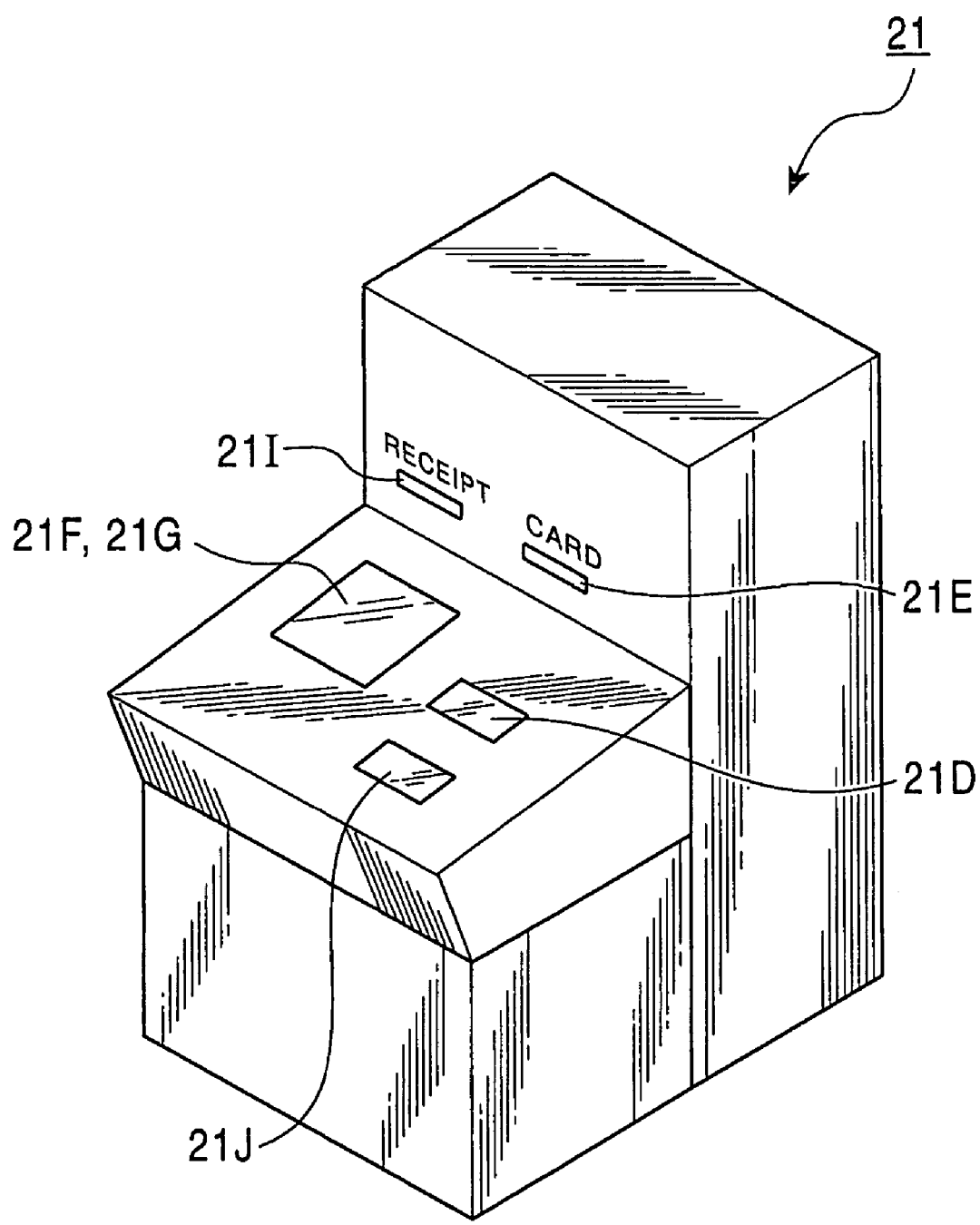
FIG. 8 is a perspective view showing the exterior of a deposit terminal.

The user who has received an IC card 50 is able to enter on the IC card 50 electronic money data equivalent to a desired amount of money, either by cash or cash card/credit cards, via the deposit terminal 21ₓ shown in FIG. 1. As shown in FIG. 8, the exterior of a deposit terminal 21ₓ, comprises a card communication unit 21D (having the same construction as that implemented by the loop antenna 62 and the modem circuit 61 in FIG. 5) for exchanging data with an IC card 50 in a contactless manner, a credit card communication unit 21E which reads out data on the magnetic stripes of cash cards/credit cards 40, a cash receiver 21J for receiving cash, a display unit 21F and an operation unit 21G provided together in a touch panel, and a receipt ejector 21l for ejecting receipts on which details of transactions are printed.

The deposit terminal 21ₓ may accept different depositing methods by which electronic money data enters an IC card 50. The user may throw cash into the cash receiver 21J so that the deposit terminal 21ₓ will write equivalent electronic money data to the RAM 58 of the IC card 50. Alternatively, the user may insert into the credit card communication unit 21E either a cash card issued from a bank or a credit card issued from a credit card company. The user then specifies a desired sum to deposit by operating the operating unit 21G so that the deposit terminal 21ₓ will transfer from a designated cash/credit card account into the IC card 50 the specified monetary value. A cash card herein refers to a card for utilizing deposits in bank accounts, while a credit card refers to a card by means of which the credit card company which has issued the credit card loans a particular amount of money to the card holder.

Figure 9:
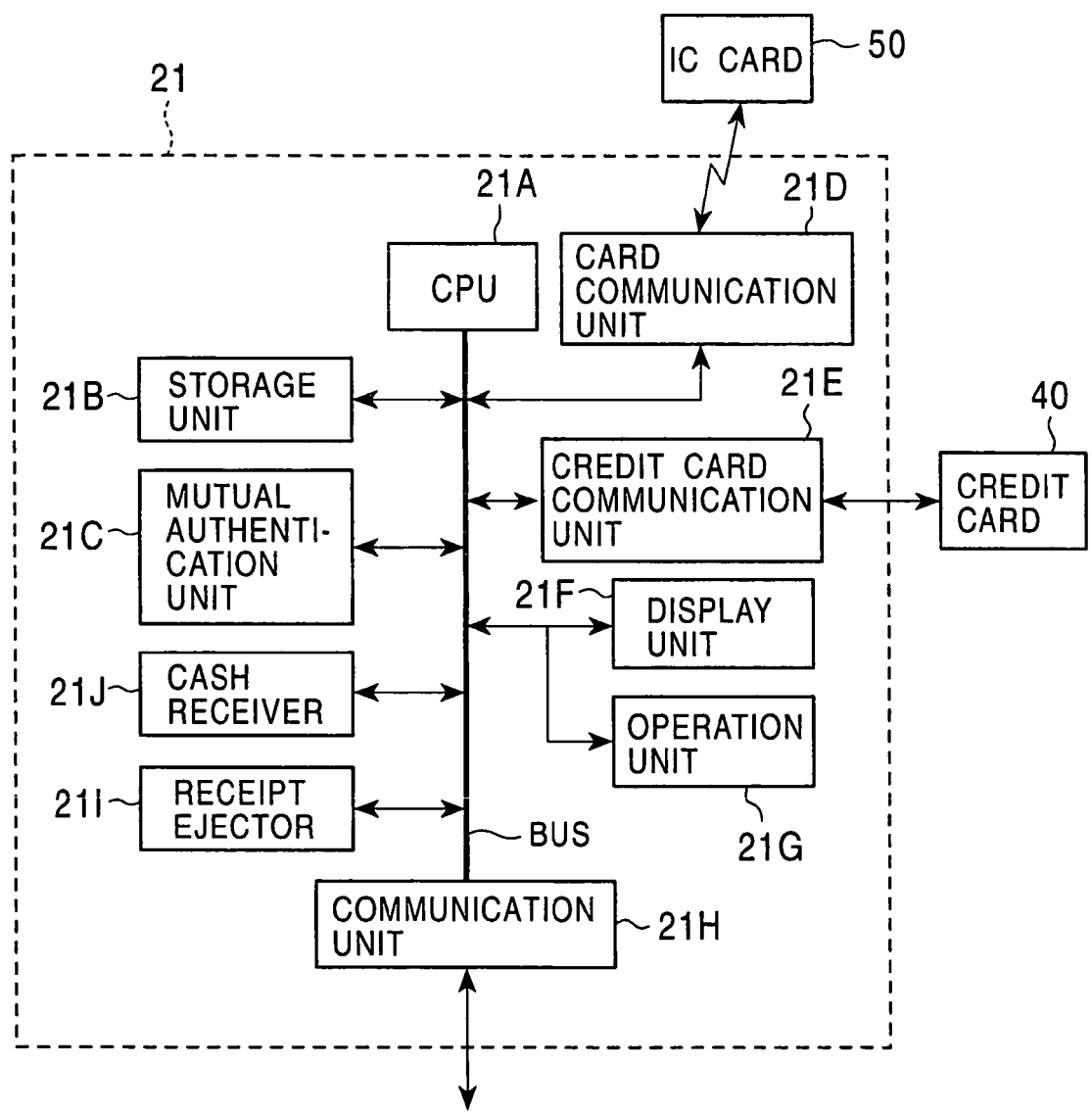
FIG. 9 is a block diagram of a deposit terminal.
Figure 10:
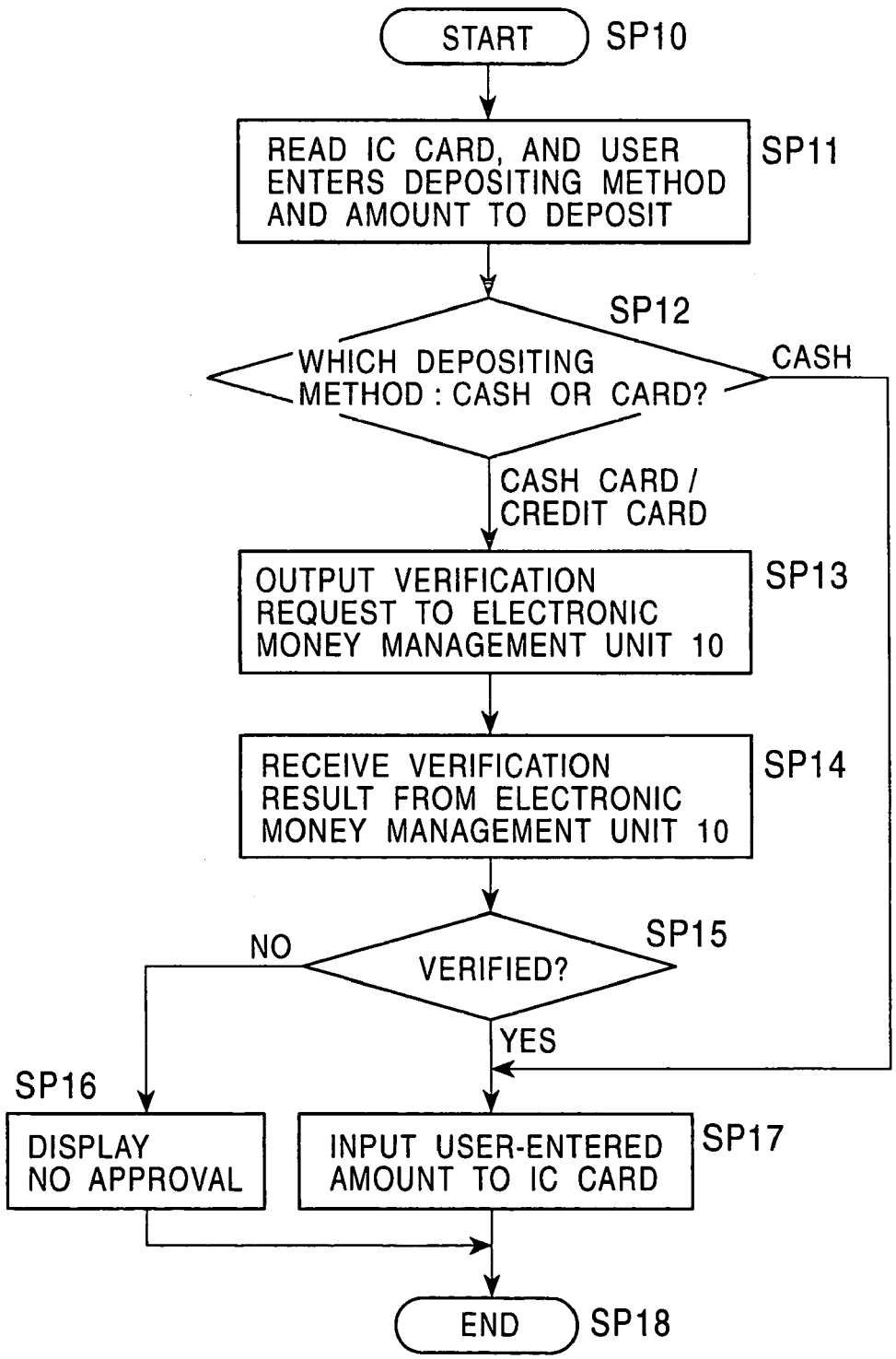
FIG. 10 is a flow chart showing a cash deposit routine using a deposit terminal.

Referring to FIG. 9, a CPU 21A in a deposit terminal 21ₓ performs a deposit processing routine, as shown in FIG. 10, according to a particular program stored in a storage unit 21B. When the user brings an IC card 50 close to the card communication unit 21D and initiates a deposit via the operation unit 21G, the CPU 21A starts the deposit processing routine (step SP10 shown in FIG. 10). The routine then proceeds to step SP11 to read out from the IC card 50 a set of information, including the card number, and to prompt the user to select the depositing method via the operation unit 21G.

If the user selects deposit by means of cash (hereinafter referred to as the first depositing method), CPU 21A opens the cash receiver 21J for the user to throw cash therein. When the user has thrown cash in the cash receiver 21J, CPU 21A counts the amount of received cash.

If the user selects deposit by means of cash card/credit card 40 (hereinafter referred to as the second depositing method), CPU 21A prompts the user with a message on the display unit 21 to insert a cash card/credit card 40 into the credit card communication unit 21E and to specify the amount to deposit. Accordingly, the user specifies the desired sum to be deposited via the operation unit 21G.

When the first depositing method has been selected by the user, the routine skips from step SP12 to step SP17. In step SP17, CPU 21A informs, via the card communication unit 21D, the IC card 50 of the amount of cash which has been thrown into the cash receiver 21J by the user. At this time, data indicating the cash amount is also transmitted via the communication unit 21H to the integrated server 16 of the electronic management unit 10 and then is stored therein. Thus, the control unit 59 of the IC card 50 adds electronic money value according to the received cash amount data to the balance of the electronic money value stored in RAM 58, thereby updating the balance data D22 (shown in FIG. 7B) indicating the electronic money balance.

Alternatively, when the user has selected the second depositing method, CPU 21A proceeds with the routine from step SP12 to step SP13. In step SP13, CPU 21A reads the magnetic stripe of the cash card/credit card 40 that has been inserted into the credit card communication unit 21E to identify the number of that particular cash card/credit card. CPU 21A then transmits via communication unit 21H to the electronic money management unit (shown in FIG. 1) the number of the cash card/credit card 40, the PIN (personal identification number) for the cash card/credit card 40 that has been entered by the user via the operating unit 21G, a verification request for the cash card/credit card 40 and the requested transaction/credit amount. At his time, the mutual authentication unit 21C of the deposit terminal $21_x$ verifies that the destination of the transmission from the CPU 21A is a legitimate one.

When the above transmission is authenticated and completed, the electronic money management unit 10 forwards via a communication line to the management computer 100 of the bank/credit card company which is in charge of the particular cash card/credit card the number of cash card/credit card, the user-entered PIN, the verification request and the requested transaction/credit amount that have been transmitted from the deposit terminal $21_x$.

The bank/credit card company management computer 100 holds therein legitimate pairs of card number and corresponding PIN for each cash card/credit card that has been issued. The bank/credit card company management computer 100 compares the pair of cash/credit card number and user-entered PIN transmitted from electronic money management unit 10 against the legitimate pairs. When a match is found, the transmitted verification request is properly received by the bank/credit card company management computer 100.

The bank/credit card company management computer 100 then checks the balance of the account designated for the cash card/credit card identified by the transmitted cash card/credit card number and also determines whether or not the card is valid based on such information as expiration date of the card and any loss or theft reported for the card.

If the user-entered amount to deposit does not exceed the balance of the designated account and the cash card/credit card is found valid, the bank/credit card company management computer 100 authorizes the transaction/credit of the amount, returns a message to that effect to the electronic money management unit 10, and transfers the specified value from the designated account to the integrated server 16 of the electronic money management unit 10. On the other hand, if the use-entered amount to deposit exceeds the balance of the designated account or the cash card/credit card is found invalid, the bank/credit card company management computer 100 rejects the request for the transaction/credit of that amount and returns a message to that effect to the electronic money management unit 10.

The electronic money management unit 10 forwards the verification result to the deposit terminal $21_x$. In step SP14 of the flow shown in FIG. 10, CPU 21A of the deposit terminal $21_x$ receives the verification result via the communication unit 21H.

If the verification result is positive, CPU 21A proceeds with the routine from step SP15 to step SP17 in which the user-specified sum is forwarded to the IC card 50. Thus, the control unit 59 of the IC card adds electronic money value according to the received sum to the balance of the electronic money value stored in RAM 58, thereby updating the balance data D22 (shown in FIG. 7B) indicating the electronic money balance.

Thereafter, CPU 21A ejects a receipt indicating the details of the transaction through the receipt ejector 21l to complete the deposit processing routine.

If the verification result received in step SP14 is negative, CPU 21A proceeds with the routine from step SP15 to step SP16. In step SP16, a message is displayed on the display unit indicating that the cash card/credit card inserted into the credit card communication unit 21E by the user has not been accepted for transaction/credit of the specified amount.

Then in step SP18 the deposit processing routine ends.

When the first depositing method is used to enter electronic money data on the IC card 50, the deposit terminal $21_x$ transmits data indicating the electronic money value to the integrated server 16 of the electronic money management unit 10 and stores the data therein. While, when the second depositing method is used to enter electronic money data on the IC card 50, the bank/credit card company management computer 100 transmits data indicating the electronic money value to the integrated server 16 of the electronic money management unit 10 and stores the data therein.

Thus, the integrated server 16 of the electronic money management unit 10 is made to hold data indicating the electronic money value deposited on the IC card 50 (by means of cash or by means of cash card/credit card).

Thus, the user is allowed to shop using the IC card in which the user has deposited a desired amount of electronic money by means of cash, cash card/credit card, etc.

Figure 11:
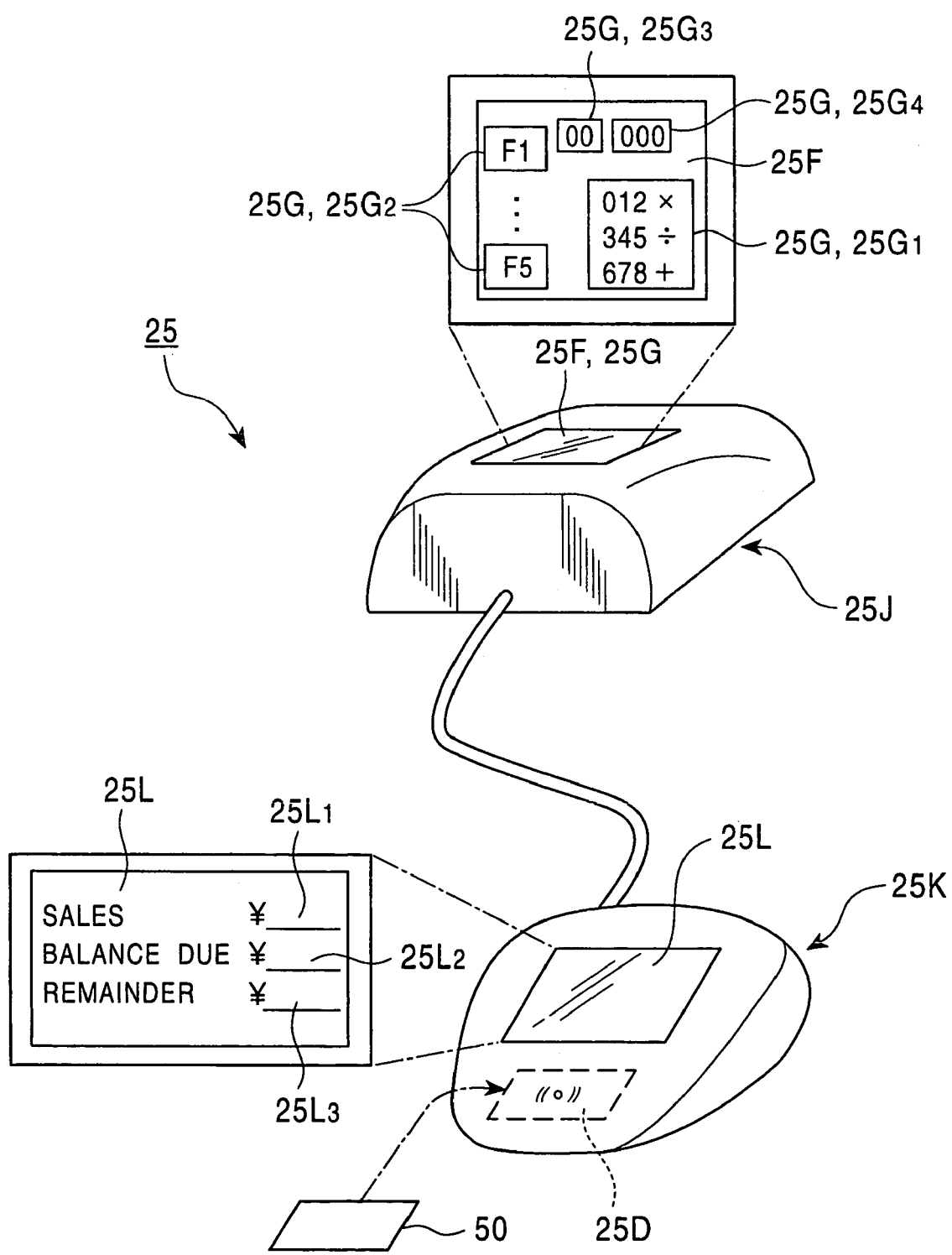
FIG. 11 is a perspective view showing the exterior of an electronic money terminal.

Different stores have their own electronic money terminals $25_x$ ($25_1$~$25_n$) that may be coupled to POS (Point Of Sale) registers. As shown in FIG. 11, the electronic money terminal $25_x$ comprises a main unit to be operated by the sales clerks and an IC card read/write unit 25K which exchanges data in a contactless manner with the IC card 50 brought close thereto by the user.

On the exterior of the main unit 25J, there are provided a display unit 25F and an operation unit 25G together in a touch panel. The operation unit 25G has arithmetic function keys $25G_1$, function keys $25G_2$, a ¥-100-unit key $25G_3$, a ¥-1000-unit key 25G$_4$, and so forth. Each function key 25G$_2$ may be preassigned with the price of merchandise frequently sold so that the salesclerk operating the main unit 25J can readily enter the sum of a plurality of items sold by using function keys 25G$_2$ and arithmetic function keys 25G$_1$ in such combination as, for example, "F1*3+F2*2". The ¥-1000-unit key 25G$_3$ and the ¥-1000-unit key 25G$_4$ are used when salesclerk enters the price of merchandise by number entry keys of the arithmetic function keys 25G$_1$.

Further, on the exterior of the IC card read/write unit 25K, there are provided a card communication unit 25D (having the same construction as that formed by the combination of the loop antenna 62 and the modem circuit 61 in FIG. 5) for exchanging data with the IC card 50 in a contactless manner and a display unit 25L for displaying details of a transaction. The arrangement is such that a user using the electronic money terminal 25$_x$ is deemed to have an intent of using IC card 50 (i.e. an intent of purchase) when the user holds the IC card 50 over (brings the IC card 50 close to) the IC card read/write unit 25K of the electronic money terminal 25$_x$.

The display unit 25L has a sales amount display area 25L$_1$ for displaying the sales amount entered by a salesclerk through the operation unit 25G at the main unit 25J, a balance due display area 25L$_2$ for displaying the amount short of sales amount when the balance on the IC card 50 is insufficient, and a balance display area 25L$_3$ for displaying the balance of the electronic money on the IC card 50 after the tranaction using IC card 50 is carried out.

Figure 12:
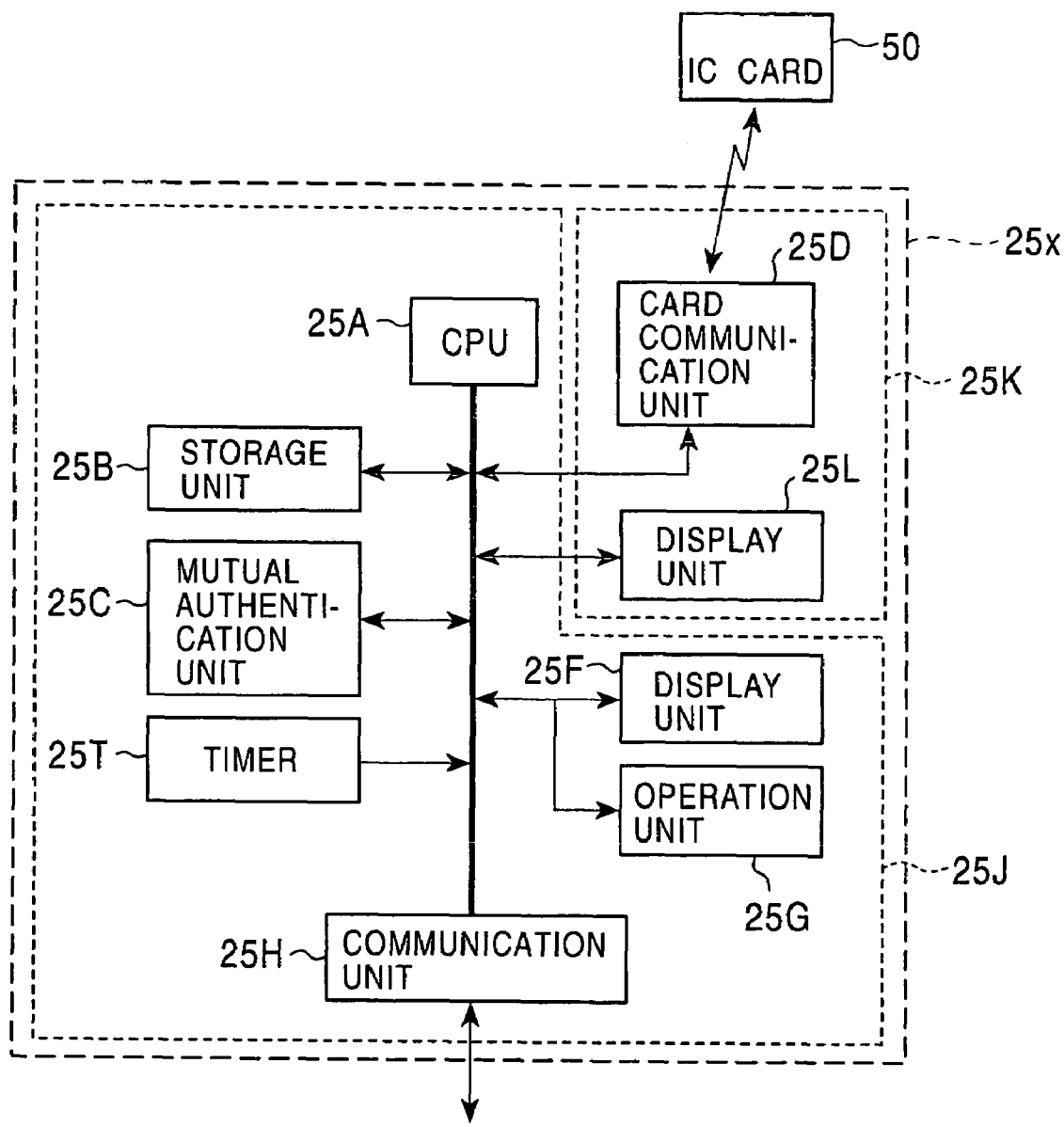
FIG. 12 is a block diagram of an electronic money terminal.

Referring now to FIG. 12, CPU 25 on the electronic money terminal 25$_x$ executes a routine for an IC card transaction in accordance with the program in FIG. 13 stored in a storage unit 25B. The CPU 25A initiates the IC card transaction routine at step SP20 when a salesclerk implements the transaction starting operation through the operation unit 25G of the main unit 25J while a user holds the IC cars 50 close to the card communication unit 25D of the IC card read/write unit 25K. Then the process proceeds to step SP21 to read such data as a card number from the IC card 50 while prompting the salesclerk to enter the sales amount though the operating unit 25G.

At this stage, as the salesclerk enters the price of the merchandise through the operation panel 25G, the CPU 25A further proceeds with the routing to step SP22 and performs a subtraction of the sales amount from the balance or remainder data D22 (FIG. 7B) stored in the RAM 58 on the IC card 50 based on the specific sales amount. At the same time, the CPU 25A serves to store, in the electronic money transaction memory area in the storage unit 2B of the electronic money terminal 25$_x$, data regarding the amount of the electronic money subtracted, the card number of the IC card 50, and date/time of the transaction. The date and time of the transaction are detected by a timer 25T provided in the main unit 25J.

When, at this stage, the sales amount is greater than the current balance (remainder) of the electronic money stored in the IC card 50, CPU 25A displays a reminding message to the display unit 25F and balance due display unit 25L and proceeds with the routine from step SP23 to step SP24 to read a credit card flag (FIG. 7B) stored in the IC card 50. When a credit card transaction is allowable, step SP25 stores in the credit card transaction memory area of the storage unit 25B of the electronic money terminal 25$_x$ the amount of the balance due as an amount to be funded by a credit card transaction.

As a result of such operations, the amount fetched from the remainder on the IC card 50, the card number of the IC card 50, and the transaction date/time data are stored in the storage unit 25B of the electronic money terminal 25$_x$ as an electronic money transaction data. The amount of the credit card transaction, the card IC of the IC card 50, and transaction date/time data are stored in the storage unit 25B of the electronic money terminal 25as credit card transaction data.

It should be noted that when the IC card 50 is handed out to an individual user, the issue data server 14 (FIG. 2) of the electronic money management unit 10 registers the account number of effective credit card issued by the credit card company each user registers and the card number of the IC card 50 at that time is set to enable the credit card transaction. Then the electronic money management unit 10 routinely checks the validity of that credit card account through interrogating the credit card company expiration date of the card, overdue payments, loss and theft information, and so forth.

If the result of this check proves that the credit card is invalid, the electronic money management unit 10 sends to each electronic money terminal 25$_x$ (25$_1$-25$_n$) a message indicating that the credit card transaction is disabled and the number of the IC card 50 on which the invalidated credit account number is registered. This prevents each terminal 25$_x$ (25$_1$-25$_n$) from performing the credit card transaction for the balance due incurred upon usage of the IC card 50, displays on display units 25F and 25L a message stating insufficiency of balance, and alters the credit card flag in the memory of the IC card 50 to disable the credit card transaction.

When the status of the credit card flag set in the memory of the IC card 50 is changed to disable the credit card transaction, each electronic money terminal 25$_x$ (25$_1$-25$_n$) conducts only electronic money transactions within the amount previously deposited. Consequently, CPU 25 on the electronic money terminal 25$_x$ proceeds with the process from step SP24 to SP26 in FIG. 13 and displays a message indicating the credit card is invalid on the display unit 25F and 25L.

When the transaction routine using the IC card 50 is finished, CPU 25A of the electronic money terminal 25$_x$ proceeds with the process to step SP27 and writes the particular transaction report as an electronic money log data D23 (FIG. 7B) on the RAM 58 of the IC card 50. Step SP28 then ends the IC card transaction routine.

As a consequence, storage unit 25B in the electronic money terminal 25$_x$ stores the amount of the transaction using the electronic money previously stored on the IC card 50 and the amount of the credit card transaction conducted when the balance of the electronic money is insufficient as separate transaction reports upon usage of the IC card 50. The transaction date/time is also stored in the storage unit 25B as transaction report data along with the transaction amount.

The electronic money log data D23 (FIG. 7B) to be written on the RAM 58 of the IC card 50 is configured to include, for example, up to fifteen transaction report blocks written in a cyclic manner, each one of the transaction report blocks consisting of 32 bytes of data, providing 12 times, as shown in FIG. 14A.

This transaction report block contains the communication identifying information D23$_1$ for identifying through the IC card 50 a communication to be written on the block at the time of the transaction, the log type data D23$_2$ indicating the type of electronic money transaction (method of deposit, type of purchase and whether the transaction involved credit card or just electronic money) of that particular transaction report, the date/time information D23$_3$ the terminal number data D23$_4$ indicating the number of the electronic money terminal used, the transaction amount (dealing value) information $D23_5$ of the particular transaction report, the key version information $D23_6$ indicating the version of the encryption key at the time the IC card 50 is used, the balance data $D23_7$ indicating the balance of the electronic money in the IC card 50 after the transaction has been carried out, the communication identifying information $D23_8$ for identifying the communication between the electronic money terminal $25_x$ used for that particular transaction and the IC card 50, and the signature information $D23_9$ written according to the key designated by the above-described key version information $D23_6$.

Thus, the control unit 59 of the IC card 50 is constructed to form the electronic money log data D23, including one transaction report block (FIG. 14A) for each transaction. The transaction using electronic money previously stored on the IC card 50 and the transaction using credit card when the balance of the electronic money is insufficient are reported separately, each forming a separate transaction report block.

The electronic money log data D23 thus formed each time a transaction using the IC card 50 is carried out is written on the RAM 58 of the IC card 50 at step SP27 of the above-described IC card transaction routine of FIG. 13. The log data D23 is also stored in the storage unit 25B of the electronic money terminal $25_x$ at above-described step SP22 and step SP25 in FIG. 13.

The CPU 25A in the electronic money terminal $25_x$ adds the card identification information D23A for identifying the IC card 50 shown in FIG. 14B to the electronic money log data D23 (FIG. 14A) and writes these information on the storage unit 25B.

This card identification information D23A includes an IC card number $D23A_1$ for specifying the IC card used in the transaction regarding that electronic money log data D23 to which that card identification information D23A is added, a transaction terminal flag $D23A_2$ for indicating whether the electronic money terminal $25_x$ writing the electronic money log data D23 coincides with the electronic money terminal $25_x$ used in that specific transaction when the electronic money log data D23 is formed, a key version information $D23A_3$ for indicating the version of communication data encryption key used when writing that electronic money log signature information $D23A_4$ written in accordance with the key designated by the key version information $D23A_3$.

When a transaction using an IC card 50 is carried out and the electronic money log data D23 is updated, the CPU 25A of the electronic money $25_x$ writes the electronic money log data D23 to the Ram 58 of the IC card and also writes the card identification information D23A and the electronic money log data D23 to the storage unit 25B of the electronic money terminal $25_x$. An IC card 50 stores an electronic money log data D23, including old data of up to the past 15 times of transaction. Every time an IC card 50 is newly used, these old data included in the electronic money log data D23 and the card identification information D23A are written to the electronic money terminal $25_x$ at which the IC card is used.

Accordingly, every time an IC card is used, an electronic money terminal $25_x$ writes the electronic money log data D23 regarding the past 15 transactions to the storage unit 25B. If an old data block included in the electronic money log data D23 has the terminal number information $D23_4$ referring to another electronic money terminal $25_x$, the terminal transaction flag $D23A_2$ included in the card identification information D23A denotes that the specific data block is indicating the transaction with another electronic money terminal $25_x$. This denotation is used by the electronic money management unit 10 for the settle and clear process performed afterwards.

Thus, an electronic money terminal $25_x$ stores transaction reports (electronic money log data D23), including transaction amount, card number, and date/time information, of each time an IC card is used. Once a day, the electronic money management unit 10 collects all the transaction reports of IC cards 50 stored in each electronic money terminal $25_x$ ($25_1$ to $25_n$).

From all the information included in IC card transaction reports (electronic money log data D23 and card identification information D23A) collected from electronic money terminals $25_x$ ($25_1$ to $25_n$), the electronic money management unit 10 then compiles the credit card transaction information regarding each IC card in every predetermined period. The electronic money management unit 10 then transmits the compiled information and the card number of an IC card 50 to the management computer 100, according to the registered credit card account number.

At this point, the management computer 100 withdraws from the user's account the total amount of money that was determined to be paid by a credit card and transfers the total amount to the electronic money management unit 10, which stores it in the integrated server 16.

Accordingly, the amounts of money memorized as the credit card transaction amounts due to insufficiency of the electronic money in the IC card 50 are put together and withdrawn from the user's account by the management computer 100 They are stored in the integrated server 16 of the electronic money management unit 10.

As described above, even when the balance of the electronic money is insufficient, so that the balance due is determined to be paid by a credit card, the management computer 100 does not immediately implement the withdrawing process. It puts together the amounts of money for the credit card payment and withdraws from the user's account afterwards so that one communication for sending a withdrawing request from the electronic money management unit 10 to the management computer 100 will cover many transactions. Thus, a communication expense will not be incurred every time an IC card 50 is used; and, an IC card 50 (a credit card) can be used even when the sales amount are small.

In every predetermined period, for example once a month, the electronic money management unit 10 settles and clears the transactions using transaction reports (electronic money log data D23 and card identification information D23A) collected once a day from money terminals $25_x$ ($25_1$ to $25_n$).

More specifically, the electronic money server 13 of the electronic money management unit 10 implements the settle and clear process shown in FIG. 15, following the order from the integrated server 16 to start processing. At step SP31, transaction reports (electronic money log data D23 and card identification information D23A) are classified by the time zones of the transactions according to the Date/Time information $D23_3$ (FIG. 14A). Meanwhile, the fee to be charged to each store to utilize the electronic money system 1 is stored in advance in the database 16C of the integrated server 16. Plural fee rates for the sales amount may be set depending on the time zones. In the present embodiment, the fee rate may be 5% when the time of the transaction using the IC card 50 is from 5:00 a.m. to 5:00 p.m. (the first time zone), and 7% for a transaction from 5:00 p.m. to 5:00 a.m. (the second time zone).

Therefore, the electronic money server 13 classifies electronic money log data D23 into the first time zone and the second time zone at step SP31 and then settles and clears the transactions according to the fee rate of each time zone.

Accordingly, the electronic money server 13 implements the settle and clear process using the fee rate of 5% for the first time zone and 7% for the second time zone. The profit for each store will be the sales amount after subtraction of the 5% fee far the transaction carried out in the first time zone and the 7% fee for the second time zone. After settling and clearing the transactions, the electronic money server 13 withdraws the profit amount according to the results of the settling and clearing from the database 16C of the integrated server 16 and transfers it to the account of each store at step SP33. At this point, the transference details, including details classified by time zones and data in total will be distributed to each store.

Then, the electronic money server 13 completes the settle and clear process at step SP34.

By changing the fee rate for utilizing the electronic money system 1 according to time zones, i.e., setting a low fee rate at daytime when relatively low-priced goods tend to be sold and a high fee rate at nighttime when relatively high-priced goods tend to be sold, the fee rate reflecting the price setting at each store can be applied.

The operation of the above-described configuration of the electronic money system 1 will be described hereinafter. A user first deposits a certain amount of electronic money (money data) in an IC card at a deposit terminal $21_x$. When the user tries to carry out the transaction using the IC card at an electronic money terminal $25_x$ at a certain store, if the electric money (money data) deposited in the IC card is insufficient for the amount the user intends to spend, the electronic money terminal $25_x$ checks the credit card flag D24 (FIG. 7B). If the credit card flag is set, the balance due is memorized as the credit card transaction amount when the electronic money transaction amount is memorized. The amount data memorized as the credit card transaction amount is settled and cleared periodically by the electronic money management unit 10.

Thus, even if the electronic money (money data) in an IC card is insufficient when a user carried out the transaction using the IC card 50 at an electronic money terminal $25_x$ in a store, the user can complete the payment by the IC card alone, without adding any cash.

Therefore, by applying the above-described configuration, a user can complete the payment using only an IC card 50 by allocating the balance due to be paid by a credit card, even when the electronic money deposited in an IC card 50 is insufficient at the electronic money terminals $25_x$.

The data regarding the money amounts determined to be paid by credit card are collectively settled and cleared together periodically by the electronic money management unit 10, making it unnecessary to request the management computer 100 to verify each time an IC card 50 is used.

All these features independently or in combination serve to further enhance the utility of IC cards 50 as substitutes for cash.

Although the invention has been described though its preferred form, it should be understood that the described embodiment is only illustrative, and various changes and modifications might be imparted thereto.

For instance, although in the described embodiment the balance due is determined by a credit card in the above description, when the electronic money deposited in the IC card is insufficient, the balance due my be paid by cash card from an account of a bank.

Furthermore, although the IC card is described above as being a contactless card, the described embodiment may be modified to allow the use of contact-type IC cards.

Still further, although the above description assumes that an IC card is used a electronic money terminals $25_x$, the invention also can be implemented such that IC cards are usable on vending machines $19_x$, provided that the vending machines $19_x$ are configured to have a function for funding the balance due from a credit card account or from a cash card account.

In the described embodiment, transaction reports on IC cards 50 stored in each electronic money terminal $25_x$ are collected once a day, and the settle and clear process is implemented once a month by the electronic money management unit 10, but various other timings of collecting transaction reports from electronic money terminals $25_x$ and implementing the settle and clear process can be applied within the scope of the present invention.

It should be appreciated by those skilled in the art that the function carried out by the IC card 50 described above can be incorporated in other types of portable electronic devices. Such as mobile telephone, mobile computers, watches, and so forth, and the use of such portable electronic devices in the described electronic money system falls within the scope of the present invention.

It should also be appreciated by those skilled in the art that usage of a memory mounted on an IC card 50 allows various additional functions besides being a carrier of the electronic money, such as identifying individuals (verifying that the person is identical by checking the registered information regarding the individual) with an employee ID. In addition, the IC card also may serve as an electronic key such as a key to enter or exit an office (for allowing a person to enter or to exit the room requiring security), railway pass, driver's license, passport, health insurance card, point awarding cad, and so forth.

What claimed is:

1. An electronic money system comprising:
   an electronic money terminal having withdrawing means for withdrawing a transaction amount from electronic money representing monetary value stored in a portable electronic device, and processing means for calculating a balance due when the transaction amount exceeds an amount stored in the portable electronic device;
   electronic money management means for compiling the transaction amount withdrawn from the electronic money through said electronic money terminal, the amount due calculated by a balance due processing means to defer payment of the balance due; and
   an alternate account reading means for reading account information for an alternate account at the electronic money terminal;
   an alternate account querying means for querying a management computer having information on the alternate account for accepting or denying use of the alternate account to credit the portable electronic device; and
   an alternate account crediting means for crediting the portable electronic device responsive to the alternate account querying means.

2. An electronic money system according to claim 1, wherein the portable electronic device is an information card.

3. An electronic money system according to claim 2, wherein the information card is a contactless information card which exchanges the amount data in a contactless manner.

4. An electronic money system according to claim 1, further comprising a money deposit terminal for updating amount data stored in the portable electronic device.

5. An electronic money system according to claim 1, wherein the balance due processing means processes the balance due to be paid on credit.

6. An electronic money system according to claim 1, wherein the balance due processing means has reading means for reading a credit flag embedded in the electronic unit.

7. An electronic money system according to claim 1, wherein the electronic money terminal has a personal identification function.

8. An electronic money system according to claim 1, wherein the electronic money terminal is integrated with a communication terminal.

9. An electronic money system according to claim 1, wherein the balance due processing means has reading means for reading a credit flag that is contained in the portable electronic device.

10. The electronic money system according to claim 1, wherein:
the alternate account reading means reads an account number and a pin number;
the alternate account querying means dispatches the account number and the pin number to the management computer; and
the alternate account crediting means credits the portable electronic device according to verification of the account number and the pin number by the management computer.

11. An electronic money system, comprising:
an electronic money terminal having means for withdrawing a transaction amount from a balance on an electronic device having information storage unit for storing electronic money representing monetary value, and for allowing a payment of a balance due to be deferred when the transaction amount exceeds the balance; and
electronic money management means for compiling the transaction amount withdrawn from the balance in the electronic device through said electronic money terminal and an amount of the allowed deferred payment;
an alternate account reading means for reading account information for an alternate account at the electronic money terminal;
an alternate account querying means for querying a management computer having information on the alternate account for accepting or denying use of the alternate account to credit the information storage unit; and
an alternate account crediting means for crediting the information storage unit based on the alternate account querying means.

12. An electronic money system according to claim 11, wherein the electronic device is a card storage medium.

13. An electronic money system according to claim 12, wherein the card storage medium is a contactless information card which exchanges transaction amount data in a contactless manner.

14. An electronic money system according to claim 11, wherein the electronic device has a communication terminal function.

15. An electronic money system according to claim 11, wherein the electronic device has a personal identification and verification function.

16. An electronic money system according to claim 11, wherein the electronic device serves as an entry or exit key.

17. An electronic money system according to claim 11, wherein the electronic money management means records date and time of the transaction using the electronic device, along with the amount of the transaction.

18. The electronic money system according to claim 11, wherein:
the alternate account reading means reads an account number and a pin number;
the alternate account querying means dispatches the account number and the pin number to the management computer; and
the alternate account crediting means credits the information storage unit according to verification of the account number and the pin number by the management computer.

* * * * *